Figure 1:
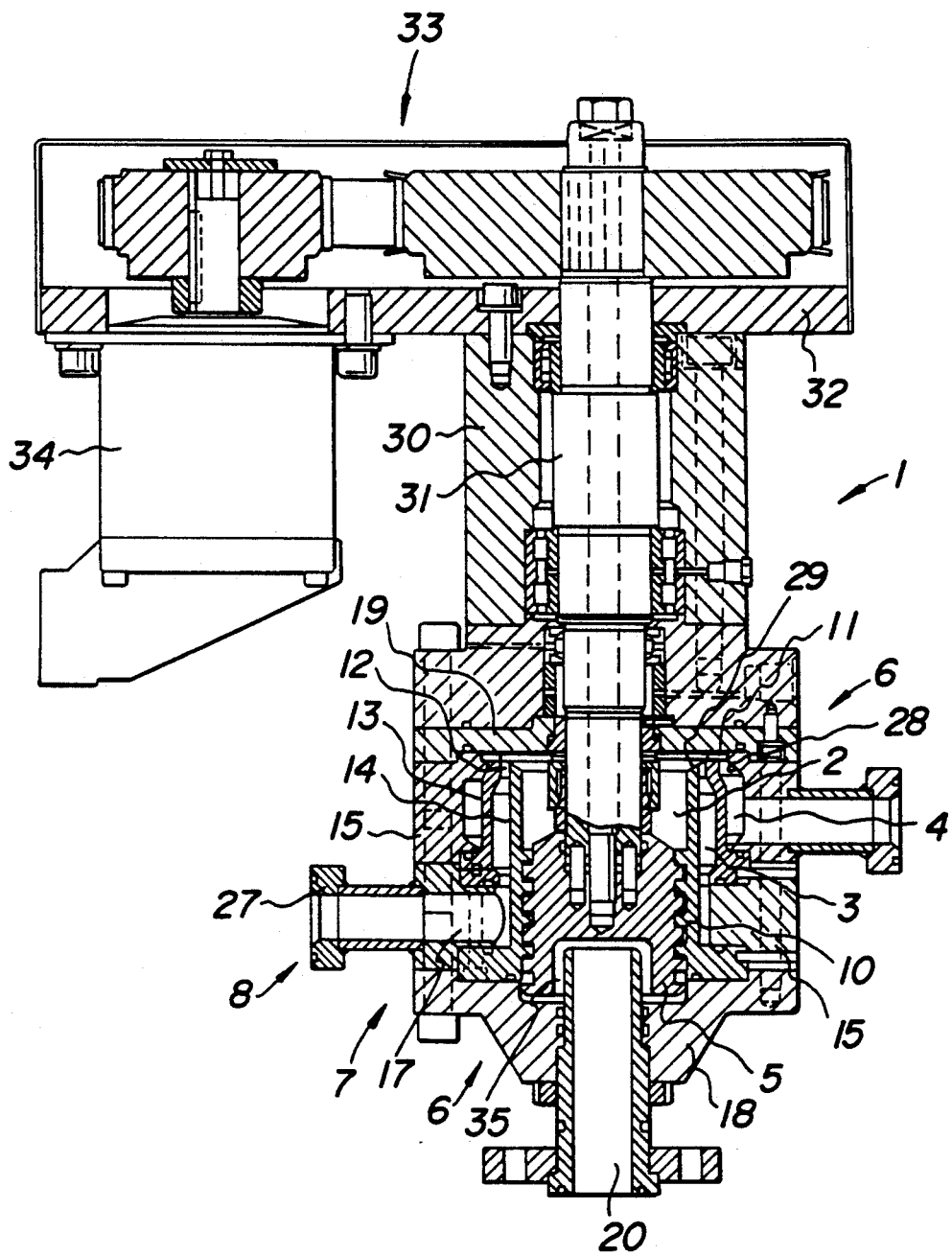

United States Patent [19]

Suter

[11] Patent Number: 5,266,261
[45] Date of Patent: Nov. 30, 1993

[54] PROCESS AND APPARATUS FOR THE PRODUCTION OF MOLDED ARTICLES FROM HOT-SETTING PLASTICS OF SEVERAL COMPONENTS BY LOW-PRESSURE CASTING

[75] Inventor: Alois Suter, Basel, Switzerland

[73] Assignee: Suter & Co., Basel, Switzerland

[21] Appl. No.: 442,338

[22] PCT Filed: Mar. 16, 1989

[86] PCT No.: PCT/CH89/00050

§ 371 Date: Nov. 17, 1989

§ 102(e) Date: Nov. 17, 1989

[87] PCT Pub. No.: WO89/08496

PCT Pub. Date: Sep. 21, 1989

[30] Foreign Application Priority Data

Mar. 18, 1988 [CH] Switzerland .................. 01-039/88-5

[51] Int. Cl.[5] ........................... B29B 7/24; B29B 7/26
[52] U.S. Cl. ............................ 264/328.6; 264/328.17;
425/200; 425/543; 366/76; 366/178; 366/193;
366/303
[58] Field of Search .............. 264/328.2, 328.6, 328.17,
264/328.18; 366/177, 178, 303, 307, 193, 76;
425/200, 582, 543

[56] References Cited

U.S. PATENT DOCUMENTS

| 3,029,069 | 4/1962 | Cummings . | |
|---|---|---|---|
| 3,871,625 | 3/1975 | Iwako . | |
| 4,002,324 | 1/1977 | Huet | 366/156 |
| 4,168,018 | 9/1979 | Zahaykevich | 366/138 |
| 4,394,980 | 7/1983 | Marz et al. . | |
| 4,439,386 | 3/1984 | Antczak | 264/328.18 |
| 4,475,817 | 10/1984 | Brunt | 366/165 |
| 4,482,254 | 11/1984 | Kessler et al. | 366/177 |
| 4,915,509 | 4/1990 | Sauer et al. | 366/177 |

FOREIGN PATENT DOCUMENTS

| 110530 | 6/1984 | European Pat. Off. . | |
|---|---|---|---|
| 2453810 | 5/1975 | Fed. Rep. of Germany . | |
| 2446729 | 4/1976 | Fed. Rep. of Germany ... | 264/328.6 |
| 3018729 | 11/1981 | Fed. Rep. of Germany . | |
| 61-285046 | 12/1986 | Japan | 264/328.6 |
| 532413 | 2/1973 | Switzerland . | |

Primary Examiner—Jill L. Heitbrink
Attorney, Agent, or Firm—Edmund M. Jaskiewicz

[57] ABSTRACT

In the production of molded articles from hot setting plastics with several components, these components are brought together under laminar flow before mixing. An apparatus for such production has a chamber (2) positioned on the back end of a mixer (6), into which feed ducts (3, 4) of the individual components positioned annularly around chamber (2) empty.

22 Claims, 2 Drawing Sheets

PROCESS AND APPARATUS FOR THE PRODUCTION OF MOLDED ARTICLES FROM HOT-SETTING PLASTICS OF SEVERAL COMPONENTS BY LOW-PRESSURE CASTING

The invention relates to a process for the production of molded articles from hot-setting plastics of several components, in particular resins, fillers and hardeners, by low-pressure casting, in which the components fed for the formation of a homogeneous plastic compound are mixed before leaving the casting device.

Such a process is used, i.a., for the production of high-quality components, especially those for insulation of electric lines and equipment.

Especially dynamic mixers, used for this purpose, because of their high speed cause in the different resin components a sedimentation, great shear forces and too great a warming. The turbulence thus reached leads to inclusion of gas in the casting compound, which entail a quality loss in the molded articles.

The object of the invention therefore is to eliminate these defects.

According to the invention as a way of achieving this object stands out a process of the type initially mentioned, in which the components, flowing laminarly, are brought together before mixing. As a result a sedimentation of the fed components can be largely prevented. At the same time, by the premixing effect achieved a remarkable reduction of the speed of the mixer and thus a smaller degree of shear forces is reached. The additional warming during mixing is reduced and the absorptive capacity of the pipes conducting the components can be improved, briefly a more subtle operation meeting the high requirements for quality and an economical production can be performed.

In such a procedure it proves particularly favorable if the components are fed to a chamber upstream from the mixing device, as a result of which an additional smoothing phase and a premixing, at selectable metering, of the individual components in the plastic compound occurs.

For performing the initially mentioned process there is particularly suitable a device for low-pressure casting of molded articles from hot-setting plastic compound of several components, such as resins, fillers and hardeners, consisting of housing receiving a drivable rotor for forming a mixer, a housing which is connected to the feed pipes for the components and exhibits an outlet for the plastic compound.

Known mixers of this type, in the processing of multi-component systems, are subject to the drawbacks that the flow conditions, changing by the changes of temperature, viscosity and amount, make difficult or prevent achieving a homogeneous mixer contents or of a plastic compound to be cast in the end, even epoxy resins mentioned above, since these changes of conditions in the pipes and spaces that are passed through lead to turbulences, which result in undesired inclusions of air.

A device for performing the process according to the invention is distinguished by a special configuration of a feed device for the components use upstream from the mixer, by being placed by a chamber on the back end of the mixer, concentrically to the axis of rotation of the rotor, adjacent to the housing, a chamber which is surrounded with spacing by several annular feed ducts, assigned to the individual components, and connected to the ducts by pipes.

The feed device allows a laminar uniform flow of the components into a chamber, in which they flow into one another under a premixing effect before they are picked up by the dynamic mixer and changed into a homogeneous plastic compound. The laminar flow condition and the premixing effect achievable by flowing into one another favor the necessary homogeneity of the plastic compound to be cast and the uniformity of the casting process.

The component feed ducts emptying into the chamber advantageously exhibit, relative to their longitudinal extension, through openings placed axially offset so that the individual components, mixing in a flat manner, penetrate into the chamber and there flow into one another on a prolonged flow path under expansion action before the final mixing procedure.

The through openings are suitably distributed on the downstream end of the annularly designed feed ducts so that already a mixing effect among the components can take place early.

For forming several annular feed ducts at least one concentrically placed nozzle ring is provided, which separates the components before entry into the chamber, but, on the other hand, produces a large surface spreading on the flowing streams.

With a nozzle ring being used, the latter, on the one hand, forms, with the mixing cylinder or wall of the chamber an inside and, on the other hand, with an intermediate ring of the mixer housing, an outside annular feed duct, so that in a simple way a smooth component flow can be achieved.

For placing the through openings on the downstream end of the nozzle ring(s), advantageously there is required a shoulder projecting radially outward or set back radially inward.

The shoulder exhibits on the periphery recesses forming radially extending ducts, recesses that connect the outside feed duct to the chamber.

Of course, it would be possible, instead of a shoulder on the nozzle ring, to design the adjacent intermediate ring with an inward projecting annular edge and to provide recesses distributed on it, so that the outside feed duct is connected to the chamber, and in any case the nozzle rings are placed axially immovably and are suitably connected to the intermediate rings forming the housing.

Advantageously the intermediate rings forming the housing are each provided with a radial bore connecting the feed pipe of the components to the feed duct assigned to it, so that in a simple way a favorable method of arrangement of the concerned structural parts or a compact embodiment of the mixer can be achieved.

Because the mixing cylinder exhibiting a chamber on its back end between a front housing closing plate and a housing intermediate ring adjacent to it and the nozzle rings concentrically surrounding the mixing cylinder or the chamber, extending at least approximately to a back housing closing plate, each being fastened between two intermediate rings, the present embodiment can also be characterized as maintenance-friendly.

The radial bores of the intermediate rings are advantageously distributed on the periphery of the housing, and their positions are determined by special markings or by pin or bolt connections.

To increase the speed of the plastic compound on the through openings of the feed ducts it is advisable for the intermediate rings or nozzle rings on their downstream end to exhibit an inwardly narrowing cross section.

The change of condition occurring in the mold with known processes in the reaction phase of the plastic compound, especially the increasing pressure which is caused by using the massive temperature rise for setting the molded articles, spread backward against the mixer and can cause a sedimentation and separation as well as a viscosity reduction in the plastic compound as far as the mixing chambers or reaction spaces.

To avoid this drawback, which occurs in all known processes and devices for the production of molded articles from hot-setting plastics of the initially mentioned type, another process step is necessary, by the feed of the plastic compound into the outlet pipe after the mixer being interrupted at the beginning of the holding pressure phase in which the cast material spreads out in the mold.

As a result the above-mentioned drawbacks are eliminated to a very great degree and an emptying of the device and pipes of separated casting compound can be avoided.

A device for performing the above-mentioned process with a mixer formed from a mixing cylinder and a drivable rotor, which can be connected to the feed pipes of the components and exhibits an outlet pipe, for the plastic compound to be cast, concentric to the axis of rotation of the rotor, adjacent to the latter, characterized in that at least one part of the outlet pipe is axially movable and with its end turned toward the mixer can rest tightly against the front side of the rotor, as a result of which effects of the holding pressure on the mixer can be prevented.

To achieve a perfect seal between mixer and outlet pipe the end of the outlet pipe resting on the front side of the rotor can be provided with a seal.

The front side of the rotor can additionally be designed with an annular groove receiving the end of the outlet pipe or for receiving a seal, and in the latter case the seal on the outlet pipe can be dispensed with.

For operation of the outlet pipe, the latter can advantageously be designed as a piston of a pneumatically or hydraulically drivable piston-cylinder unit.

For this purpose, a piston ring is fastened on the periphery of the outlet pipe, which divides the cylinder, surrounding it tightly, into two spaces that can be acted on.

The piston-cylinder unit is open on one side and tightly connected to the front housing closing plate of the mixer housing.

The front housing closing plate, in which the outlet pipe moves parallel to the axis of rotation of the rotor, is provided as a sealing arrangement, which separates the one cylinder space from the mixing chamber.

Figure 2:
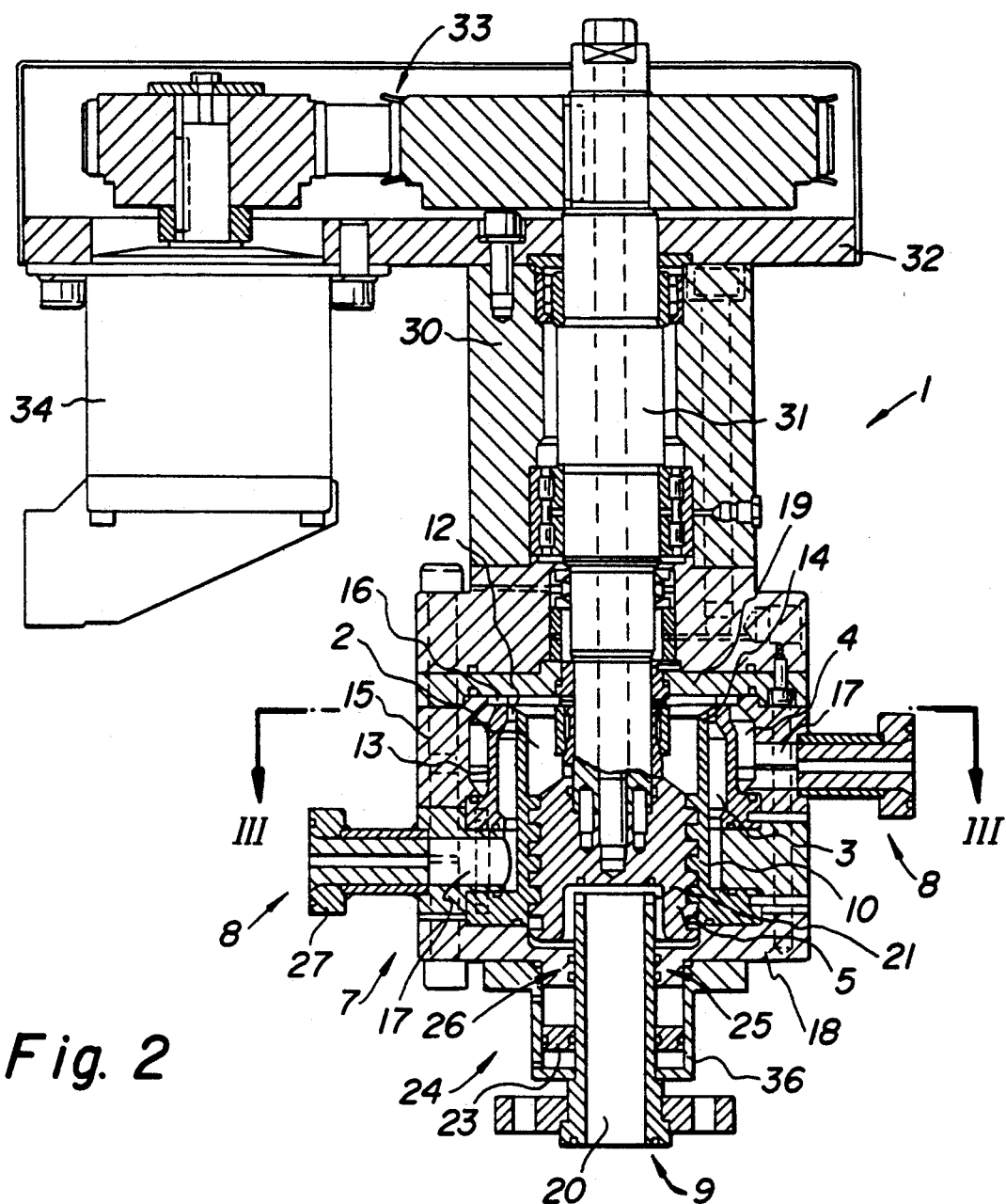
Figure 3:
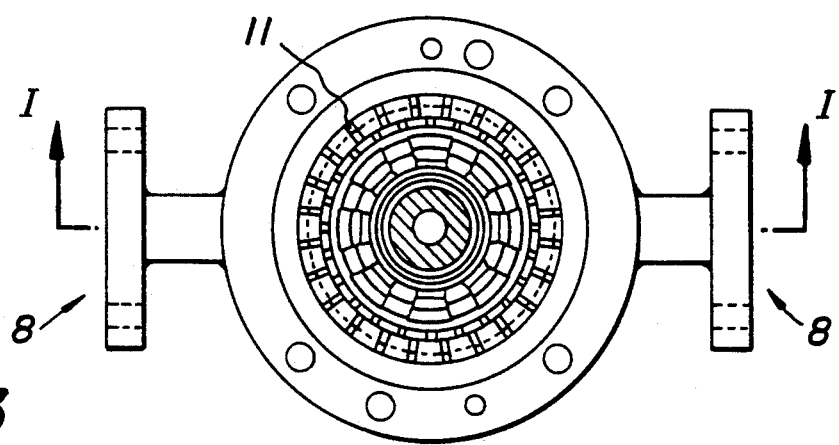

The invention according to the process and the object of the invention are explained below in detail by embodiments represented in the drawing. There are shown in:

FIG. 1, a longitudinal section through an object of the invention along line I—I in FIG. 3, FIG. 2, a longitudinal section through an alternative embodiment of the object of the invention along line I—I in FIG. 3 and FIG. 3 a cross section through the object of the invention along line III—III of FIG. 2.

FIGS. 1 to 3 show a device 1 for performing the present process according to the invention, on the back end of a mixer 6, concentrically to the axis of rotation of rotor 5, there is provided a chamber 2 adjacent to mixing cylinder 10, a chamber which is surrounded with spacing by several annular feed ducts 3, 4, assigned to the individual components of the plastic compound, and connected to the ducts by pipes so that the components flowing laminarly can be brought together. This device 1 is fastened by a bearing housing 30, which receives drive shaft 31 of rotor 5, to a mounting plate 32, on which a motor 34 driving a toothed belt gear 33 of drive shaft 31 is provided. The other details relative to the design of the drive construction can be gathered from FIGS. 1 and 3. Rotor 5 of mixer 6 is bolted and pinned on the front end of drive shaft 31 and, like mixing cylinder 10, can be exchanged. Chamber 2, which is formed by a cylindrical wall 14, is connected to mixing cylinder 10 at the back. Chamber 2 is surrounded by several annular feed ducts 3, 4, assigned to the individual components of the plastic compound, and connected to the ducts by pipes. Using the laminar flow properties, feed ducts 3, 4 on the back end of chamber 2 empty into the hollow space formed by the latter and thus develop a largely turbulence-free premixing. For this purpose, feed ducts 3, 4 exhibit through openings 11, 12, which are mutually offset or placed beside one another, so that the liquid components flow from the outside radially inward into the chamber and there are randomly distributed and mixed. Feeding of the components takes place under pressure by pumps. The annular chamber put around drive shaft 31 connected to rotor 5 is limited on the back end by a tight closing plate 19. To form feed ducts 3, 4 a nozzle ring 13 is placed concentrically between chamber 2 or its wall 14 and at least one intermediate ring 15 of mixer housing 7, and nozzle ring 13 is inserted motionless in a recess of two intermediate rings 15 provided for this purpose. Nozzle ring 13 has through openings 11 distributed on the periphery on the downstream end of feed ducts 3, 4. Nozzle ring 13, forming an inside or outside feed duct 3 or 4 with mixing cylinder 10 or wall 14 and an intermediate ring 15 of the mixer housing 7, exhibits on the downstream end a shoulder 16 on whose periphery there are distributed recesses, extending radially, forming through openings 11, 12. Shoulder 16 can project radially outward and be designed inwardly set back, so that fan-shaped through openings 11, 12, respectively distributed relative to the periphery, are formed. Intermediate rings 15 forming mixer housing 7 are provided with radial bores 17, which connect feed ducts 3, 4 and feed pipes 8 of the individual components assigned to one another. For this purpose radially projecting pipe connections 27 are attached, in a distributed manner, on the periphery of intermediate rings 15. Device 1 proves to be altogether a compact embodiment since chamber 2 is, connected directly to mixing cylinder 10 and nozzle ring 13 (there can be several of them), extending at least approximately to the back end of chamber 2, between which inserted intermediate rings 15 are anchored by a front housing closing plate 18 and rear housing closing plate 19. Moreover, both intermediate ring 15 and nozzle ring 13 are provided in the area where they empty into chamber 2 with constructive measures promoting the flow deflection, i.e., the compound stream is deflected inward, for which a corresponding deflecting edge 28 is provided on intermediate ring 15 and wall 14 of chamber 2 exhibits a set-back bevel 29. Under the feed pressure, the components already spreading in chamber 2 reach mixer 6 and outlet pipe 20, which is anchored tight in the front housing closing plate. After leaving mixer 6, the plastic compound flows back over the front surface of rotor 5 through an annular slot 35, formed from a cylindrical bore on the front surface of rotor 5 and the outside surface of pipe-shaped outlet pipe 20, into outlet pipe 20, which is connected directly or indirectly to a mold (not shown).

With reference to the difficulties in the mixer or in the plastic compound (as initially mentioned) occurring by the coming in of a holding pressure during casting of molded articles, the invention is distinguished by another process step, because at the beginning of the holding pressure reacting on mixer 6 in the setting phase, feeding of the plastic compound into outlet pipe 20 after mixture 6 is interrupted.

An alternate embodiment is shown in FIG. 2 in which at least a part of outlet pipe 20 being axially movable and with its end turned toward mixture 6 being tightly movable on the front side of rotor 5 in the performance of this process with mixer 6, formed from a mixing cylinder 10 and drivable rotor 5, a mixer that can be connected to feed pipes 8 of the individual components and has an outlet pipe 20 for the plastic compound to be cast concentric to the axis of rotation of rotor 5 and connected to it. Thus immediately before the outflow from mixer 6 an interruption of the compound flow takes place by axial movement of the outlet 20 inwardly so that its inner end contacts the front of the rotor, so that the holding pressure cannot have its effects on the mixer or the plastic compound present there. A seal 21 on the front side of the end of outlet pipe 20 turned toward rotor 5 promotes the sealing at this point.

Alternately the front side of rotor 5 can designed with a groove 35 for receiving a seal and/or for immersion of outlet pipe 20.

For operation of outlet pipe 20, for example, a piston-cylinder unit 24 is suitable, in which as piston 23 a ring is tightly connected to outlet pipe 20, which separates cylinder 36 surrounding it into two spaces that can be hydraulically or pneumatically acted on. Piston-cylinder unit 24 is fastened by a flange on the cylinder on front housing closing plate 18, through which outlet pipe 20 penetrates. Housing closing plate 18 and outlet pipe 20 form a sliding guide 25, which is provided with a sealing arrangement 26.

I claim:

1. Process for the production of molded articles from hot-setting plastics of several components by low-pressure casting, in which the components for the formation of a homogeneous plastic compound are mixed before entering a casting device, comprising the steps of laminarly flowing the components along separate concentric paths into a chamber, and bringing the laminarly flowing components together in the chamber prior to mixing thereof.

2. Process according to claim 1, wherein the components are each fed by an annular gap (3, 4) to said chamber (2).

3. Process as claimed in claim 1 wherein at the beginning of a holding pressure of the plastic compound reacting in the chamber of a mixer, feeding of the plastic compound into an outlet pipe after the mixer is interrupted.

4. A device for the preparation of homogeneous hot-setting multi-component plastics in which the components of the plastic are mixed before entering a low-pressure casting device, comprising a housing having a driveable rotor therein, cylindrical means surrounding said rotor for defining therewith a cylindrical mixing chamber having an axial outlet opening at one end thereof, an inlet chamber coaxial with said rotor at another end of said mixing chamber and communicating therewith, means for defining a plurality of concentric annular feed ducts surrounding said inlet chamber, a plurality of feed pipes each communicating with a one of said feed ducts to supply a one of several components into a said feed duct, and means for defining through openings between each of said annular feed ducts and said inlet chamber such that said components enter said inlet chamber together in a laminar flow for subsequent mixing.

5. Device according to claim 4 wherein said feed ducts (3, 4) of the components emptying into said chamber (2) have offset through openings (11, 12).

6. Device according to claim 5, wherein said through openings (11, 12) are distributed on the downstream end of at least one feed duct (3, 4).

7. Device according to claim 6, wherein said annular feed ducts (3, 4) comprise at least one concentrically arranged nozzle ring (13).

8. Device according to claim 7 wherein said housing comprises a rear closing plate at said inlet chamber, a front closing plate containing said outlet opening and a plurality of intermediate rings between said front and rear closing plates; said nozzle ring being concentric to said inlet chamber and having an end spaced closely to said rear closing plate.

9. Device according to claim 7, wherein the through openings are on the ends of said feed ducts (3, 4) and are arranged offset to one another.

10. Device according to claim 4, wherein a nozzle ring (13) is concentric with said cylindrical means (14) to define an inside feed duct (3) and said housing having an intermediate ring (15) having a wall and said nozzle ring spaced inwardly of said housing ring wall to form an outside annular feed duct (4).

11. Device according to claim 10, comprising a shoulder (16) projecting radially outward or set back radially inward to define said through openings (11, 12) on the downstream end of said nozzle ring (13).

12. Device according to claim 11, wherein said shoulder (16) has distributed on the periphery, recesses defining said radially extending through openings (11).

13. Device according to claim 10, wherein said nozzle ring (13) is placed axially immovably and fastened on intermediate rings (15) forming said housing (7).

14. Device according to claim 10, wherein a plurality of intermediate rings (15) forming the housing are each provided with a radial bore (17) connecting said feed pipe (8) of each component to said feed duct (3, 4) respectively.

15. Device according to claim 14 wherein said radial bore is on the periphery of said intermediate rings.

16. Device according to claim 10 wherein one of said intermediate rings (15) or nozzle rings (13) have on their downstream ends an inwardly narrowing cross section.

17. Device according to claim 4 wherein at least one part of said axial outlet opening (20) is axially movable and an end of said axial outlet opening directed toward said mixing chamber is engageable against a front side of said rotor (5).

18. Device according to claim 17, wherein the end of said outlet opening (20) resting on the front side of said rotor (5) has a seal (21).

19. Device according to claim 18, wherein the front side of said rotor (5) has an annular groove (35) receiving the end of said outlet opening (20).

20. Device according to claim 18, wherein said outlet opening (20) comprises a piston (23) of a pneumatically or hydraulically driveable piston-cylinder unit (24).

21. Device according to claim 17, wherein a piston-cylinder unit (24) is fastened to a front housing closing plate (18) of said housing (7).

22. Device according to claim 21, wherein said housing closing plate (18) of said housing (7) has a sliding guide (25), formed with said outlet opening (20), with a sealing arrangement (26). R

* * * * *